US012171154B2

(12) United States Patent
Torzewski et al.

(10) Patent No.: US 12,171,154 B2
(45) Date of Patent: Dec. 24, 2024

(54) WORK VEHICLE GUIDANCE AND/OR AUTOMATION OF TURNS WITH RESPECT TO A DEFINED WORK AREA

(71) Applicant: Deere & Company, Moline, IL (US)

(72) Inventors: Michael Torzewski, Waukee, IA (US); Ryan C. Burnley, Ankeny, IA (US); Simon Schaefer, Ankeny, IA (US)

(73) Assignee: Deere & Company, Moline, IL (US)

( * ) Notice: Subject to any disclaimer, the term of this patent is extended or adjusted under 35 U.S.C. 154(b) by 352 days.

(21) Appl. No.: 17/834,466

(22) Filed: Jun. 7, 2022

(65) Prior Publication Data

US 2023/0389459 A1    Dec. 7, 2023

(51) Int. Cl.
*A01B 69/04*   (2006.01)
*A01B 69/00*   (2006.01)
*G05D 1/00*    (2024.01)
*G05D 1/02*    (2020.01)

(52) U.S. Cl.
CPC .......... *A01B 69/008* (2013.01); *A01B 69/004* (2013.01); *G05D 1/0061* (2013.01); *G05D 1/0219* (2013.01); *G05D 1/0223* (2013.01)

(58) Field of Classification Search
CPC .. A01B 69/008; A01B 69/004; G05D 1/0061; G05D 1/0219; G05D 1/0223; G05D 1/644; G05D 2105/15; G05D 2107/21; G05D 2109/10; G05D 1/648
See application file for complete search history.

(56) References Cited

U.S. PATENT DOCUMENTS

| | | | | |
|---|---|---|---|---|
| 7,451,030 B2* | 11/2008 | Eglington | ............... | G01S 19/14 701/410 |
| 7,689,354 B2 | 3/2010 | Heiniger et al. | | |
| 7,706,948 B2* | 4/2010 | Dix | ...................... | G05D 1/0219 701/50 |
| 7,747,370 B2* | 6/2010 | Dix | ...................... | A01B 69/008 701/50 |
| 8,082,097 B2* | 12/2011 | Hilliar Isaacson | ......................... | G01C 21/3461 701/411 |
| 8,694,382 B2* | 4/2014 | Aznavorian | ......... | G05D 1/0278 340/963 |
| 9,020,757 B2* | 4/2015 | Peake | .................. | A01B 69/008 180/443 |

(Continued)

*Primary Examiner* — Mussa A Shaawat
(74) *Attorney, Agent, or Firm* — Gary L. Montle; Lucian Wayne Beavers; Patterson Intellectual Property Law, PC

(57) ABSTRACT

Systems and methods are provided for guidance and/or automation of work vehicles operating within defined work areas. Initially, a first (e.g., figure eight) turn type is selected at least to transition between first and second parallel paths across the work area for reciprocal traverse thereof, further for optimizing a footprint with respect to at least an alternative second (e.g., U-turn) turn type. Responsive to said selection, a first turn plan is generated along with associated output signals for the first turn type relative to contours of the defined work area. Sequence points for the turn may be generated based on determined work coverage. If the work vehicle is determined unable to complete the generated first turn plan for the first turn type, based on detected work vehicle conditions relative to contours of the work area, a second turn plan is instead automatically generated and performed for the second turn type.

20 Claims, 5 Drawing Sheets

(56) References Cited

U.S. PATENT DOCUMENTS

| | | | | |
|---|---|---|---|---|
| 9,826,673 | B1* | 11/2017 | Ray | A01B 79/005 |
| 10,143,126 | B2 | 12/2018 | Foster et al. | |
| 10,251,329 | B2 | 4/2019 | Foster et al. | |
| 11,052,943 | B2 | 7/2021 | Bunderson et al. | |
| 2008/0103694 | A1* | 5/2008 | Dix | A01B 69/008 |
| | | | | 701/425 |
| 2010/0318253 | A1* | 12/2010 | Brubaker | G05D 1/0278 |
| | | | | 701/25 |
| 2014/0324291 | A1* | 10/2014 | Jones | G01S 19/44 |
| | | | | 701/41 |
| 2016/0021813 | A1* | 1/2016 | Matthews | A01B 69/00 |
| | | | | 701/26 |
| 2017/0308091 | A1* | 10/2017 | Bunderson | A01B 69/008 |
| 2017/0354078 | A1* | 12/2017 | Foster | A01B 69/00 |
| 2017/0354079 | A1* | 12/2017 | Foster | G05D 1/0276 |
| 2018/0321683 | A1 | 11/2018 | Foster et al. | |
| 2018/0373256 | A1* | 12/2018 | Runde | A01B 69/008 |
| 2018/0373257 | A1* | 12/2018 | Runde | G05D 1/0278 |
| 2019/0353483 | A1 | 11/2019 | Liu et al. | |
| 2021/0405644 | A1* | 12/2021 | Berridge | A01B 69/008 |
| 2022/0167543 | A1* | 6/2022 | Bast | G05D 1/0223 |
| 2022/0287218 | A1* | 9/2022 | Yuasa | A01B 69/008 |
| 2023/0119306 | A1* | 4/2023 | Burnley | A01B 69/001 |
| | | | | 701/23 |

* cited by examiner

WORK VEHICLE GUIDANCE AND/OR AUTOMATION OF TURNS WITH RESPECT TO A DEFINED WORK AREA

FIELD OF THE DISCLOSURE

The present disclosure relates generally to a method and system for path planning, as well as operator guidance and/or automation of a work vehicle with respect to a defined work area.

BACKGROUND

A path planner may be used to determine one or more path plans for a self-propelled work vehicle to cover a work area. The work area may for example represent a field for growing a crop or other vegetation. The work vehicle may need to traverse the entire work area or a portion thereof to plant a crop, to treat a crop, to harvest a crop, or to perform another task associated with the crop or vegetation, to name non-limiting examples.

Conventional guidance systems are known to allow operators to navigate end turns that are defined by guidance line and boundary information. Some operations require additional turn types to minimize the amount of work done in the field while aligning with the exterior boundary.

Tillage operations are typically achieved using guidance lines that are slightly askew with the crop row. For example, if a field is planted and harvested with a zero-degree heading, the corresponding tillage operation may typically be worked with a guidance line heading of forty-five degrees or below. Running a deep tillage operation at such an angle ensures that the soil structure is more uniform for a following planting operation.

Operators can run this tillage operation with multiple types of boundary configurations, which may typically include the definition of headlands. This is particularly the case for conventional systems and methods which include turn automation. If one or more offsets (e.g., top and bottom offsets) are selected for headland boundaries with respect to an exterior field boundary, an operator would require a turn type that keeps them within their field boundary while minimizing the amount of area worked within the field by driving the turn.

It would accordingly be desirable to allow operators to select from a group of, or switch between, various turn types for optimizing work coverage while preserving field boundary integrity.

BRIEF SUMMARY

The current disclosure provides an enhancement to conventional systems, at least in part by introducing a novel system and method for optimizing an operator's ability to turn around within a field boundary, via guidance, automation, or the like. By selectively implementing a figure eight turn, for example, a turn plan may be generated that is drawn relative to the field boundary. By drawing a turn that follows the contour of the field boundary, the operator may preferably avoid making multiple headland passes. The figure eight turn as disclosed and implemented herein may preferably have a smaller footprint regarding infield work area as compared to the more conventional turn types such as simple U-turns.

According to a first embodiment as disclosed herein, a computer-implemented method is provided for guidance and/or automation for a self-propelled work vehicle operating within a defined work area. The method includes selecting a first turn type, and more particularly a figure eight turn type, to be executed at least to transition between a first path across at least a portion of the work area into a second path substantially parallel to the first path and having no intervening paths there between for reciprocal traverse of the at least a portion of the work area. Responsive to said selection, the method further includes automatically generating a first turn plan and associated output signals for the first turn type relative to one or more contours of the defined work area.

In a second embodiment, further exemplary aspects according to the above-referenced first embodiment may include, upon ascertaining that the work vehicle is unable to complete the generated first turn plan, based on one or more detected work vehicle conditions relative to at least the one or more contours of the defined work area, automatically selecting a second turn type from a plurality of available turn types as alternatives to the first turn type, generating a second turn plan for the second turn type, and producing output signals for automated performance of the second turn plan.

Further exemplary aspects according to the second embodiment may include generating a plurality of sequence points in association with the generated first turn plan, and ascertaining that the work vehicle is unable to complete the generated first turn plan based on a deviation between an actual trajectory of the work vehicle relative to one or more of the plurality of sequence points.

In a third embodiment, further exemplary aspects according to one of the above-referenced first or second embodiments may include enabling manual selection of the first turn type or the second turn type from a plurality of selectable turn types via an onboard user interface.

In such an embodiment, the output signals for the first turn type and with respect to a current turn may for example be provided to an onboard display unit for displaying one or more dynamically generated sequence points based on a determined work coverage for the work vehicle with respect to at least the one or more contours of the defined work area and one or more previous traversed paths of the work vehicle within the one or more contours of the defined work area. Alternatively, the displayed one or more sequence points for a current turn may be predetermined based on a lack of determined work coverage for the work vehicle with respect to the one or more contours of the defined work area.

Further exemplary aspects according to the above-referenced third embodiment may include that the first turn plan is generated based at least in part on a footprint optimization routine and/or a work coverage optimization routine.

In a fourth embodiment, further exemplary aspects according to one of the above-referenced first to third embodiments may include automatically selecting the first turn type from a plurality of selectable turn types based at least in part on a best fit analysis of each selectable turn type with respect to at least one specified quality metric.

In a fifth embodiment, further exemplary aspects according to one of the above-referenced first to fourth embodiments may include generating the output signals associated with the first turn type for automatically controlling a trajectory and/or advance speed for the work vehicle.

Further exemplary aspects according to the above-referenced fifth embodiment may include generating the output signals associated with the first turn type for automatically controlling a raised and/or lowered position for each of one or more work implements.

Further exemplary aspects according to the above-referenced fifth embodiment may include that a controls sequence is executed based on a determined work coverage for the work vehicle with respect to at least the one or more contours of the defined work area and one or more previous traversed paths of the work vehicle within the one or more contours of the defined work area. Alternatively, a predetermined controls sequence may be executed based on a lack of determined work coverage for the work vehicle with respect to the one or more contours of the defined work area.

Further exemplary aspects according to one of the above-referenced first to fifth embodiments may include that the defined work area comprises one or more impassable exterior contours, one or more passable offset contours with respect to at least one of the one or more impassable exterior contours, and/or one or more impassable interior boundaries within the one or more impassable exterior contours.

In an eighth embodiment, a system may be provided for guidance and/or automation of a self-propelled work vehicle operating within a defined work area. The system includes a user interface configured to receive user input corresponding to a selected turn type from a plurality of selectable turn types, and a controller configured to direct the performance of steps in a method according to any one of the above-referenced first to fifth embodiments.

Numerous objects, features and advantages of the embodiments set forth herein will be readily apparent to those skilled in the art upon reading of the following disclosure when taken in conjunction with the accompanying drawings.

BRIEF DESCRIPTION OF THE DRAWINGS

FIG. 4 is a graphical diagram representing an exemplary defined work area including exterior boundaries and two headland areas offset there from.

DETAILED DESCRIPTION

With reference herein to the representative figures, various embodiments may now be described of an inventive system and method.

Figure 1:
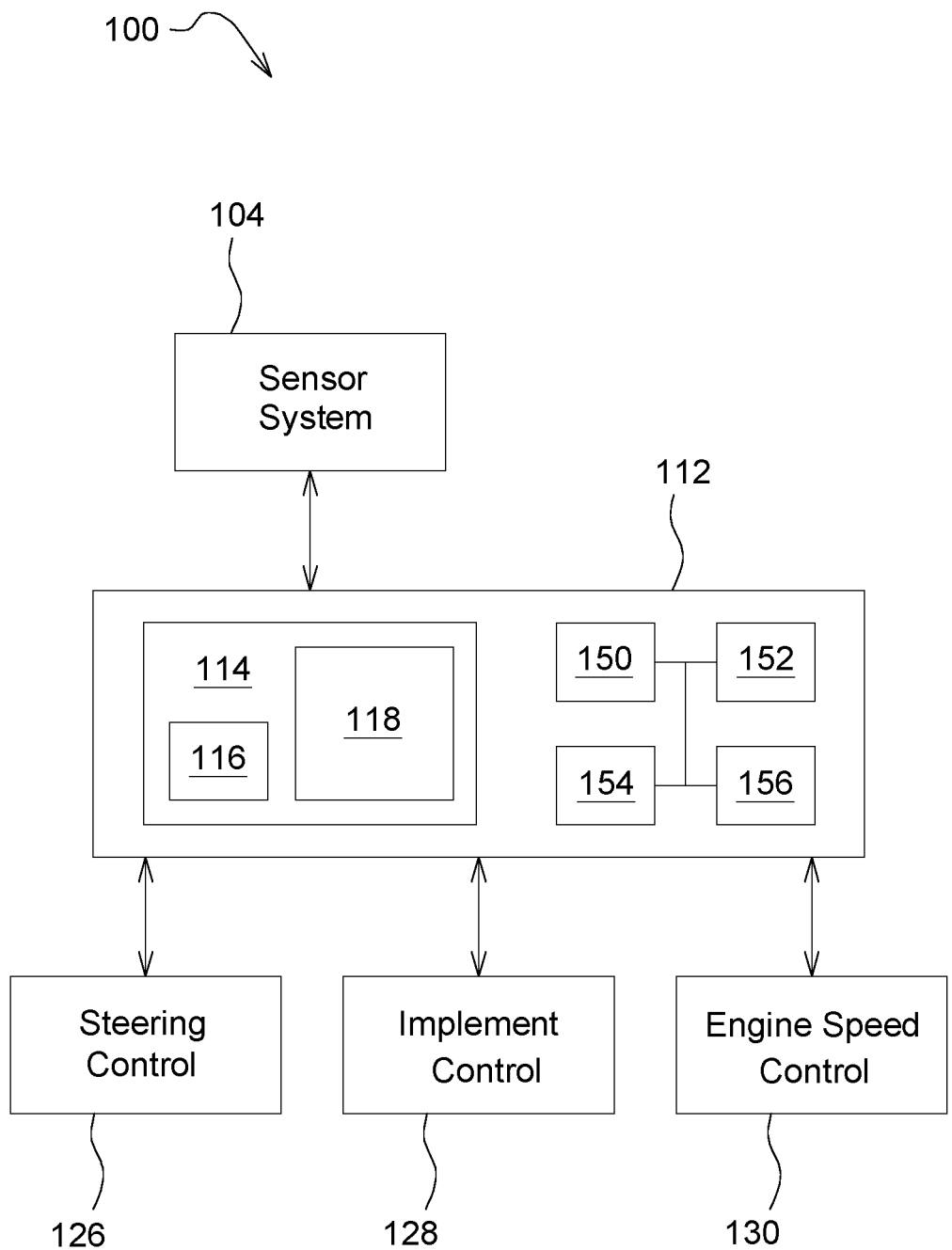
FIG. 1 is a block diagram representing a work vehicle control system according to an embodiment of the present disclosure.

FIG. 1 in a particular embodiment as disclosed herein shows a system 100 for planning and/or controlling the path of a work vehicle 102. The system 100 of FIG. 1 includes a sensor system 104 coupled or otherwise functionally linked to a vehicle controller 112 including a user interface 114. In turn, the vehicle controller 112 may have integrated therein or otherwise communicate with a steering control unit 126, an implement control unit 128, and/or an engine speed control unit 130. Such control units and respective functions, among others, may be discrete in nature or otherwise combined in various embodiments without departing in any way from the scope of the present disclosure.

The vehicle controller 112 may generate output signals corresponding to display and/or automatic control of various operations of the work vehicle 102 consistent with a generated path plan, unless or until detection of for example an obstacle, obstruction, hazard, a safety condition, or another condition that requires the work vehicle to depart from the planned path, to stop movement, or take evasive measures to avoid a collision with an object or living being (e.g., a person or animal). The vehicle controller 112 may generate control signals for any or all of the steering control unit 126, the implement control unit 128, and/or the engine speed control unit 130, and/or any other component or system that is/are consistent with tracking the path plan and subject to modification or interruption by the system 100 or another system. For example, control signals may comprise a steering control signal or data message that defines a steering angle of the steering shaft, a braking control signal or data message that defines the amount of deceleration, hydraulic pressure, or braking friction to the applied to brakes, a propulsion control signal or data message that controls a throttle setting, a fuel flow, a fuel injection system, vehicular speed or vehicular acceleration. Further, where the vehicle 102 may be propelled by an electric drive or electric motor, the propulsion control signal may control or modulate electrical energy, electrical current, electrical voltage provided to an electric drive or motor. The control signals generally vary with time as necessary to track the path plan. The lines that interconnect the components of the system 100 may comprise logical communication paths, physical communication paths, or both. Logical communication paths may comprise communications or links between software modules, instructions or data, whereas physical communication paths may comprise transmission lines, data buses, or communication channels, to name non-limiting examples.

The steering control unit 126 may comprise or otherwise interact with an electrically controlled hydraulic steering system, an electrically driven rack and pinion steering, an Ackerman steering system, or another steering system. The engine speed control unit 130 may comprise or otherwise interact with an internal combustion engine, an internal combustion engine-electric hybrid system, an electric drive system, or the like.

The sensor system 104 may for example comprise a position determining system and/or an obstacle detection system which individually or collectively include one or more of global positioning system (GPS) sensors, vehicle speed sensors, ultrasonic sensors, laser scanners, radar wave transmitters and receivers, thermal sensors, imaging devices, structured light sensors, and other optical sensors, wherein exemplary imaging devices may include a digital (CCD/CMOS) camera, an infrared camera, a stereoscopic camera, a time-of-flight/depth sensing camera, high resolution light detection and ranging (LiDAR) scanners, radar detectors, laser scanners, and the like within the scope of the present disclosure.

The vehicle controller 112 may be configured to produce outputs, as further described below, to a user interface 114 associated with a display unit 118 for display to the human operator. The vehicle controller 112 may be configured additionally or in the alternative to produce outputs to a display unit independent of the user interface 114 such as for example a mobile device associated with the operator or a remote display unit independent of the work vehicle 102. The vehicle controller 112 may be configured to receive inputs from the user interface 114, such as user input provided via the user interface 114. Not specifically represented in FIG. 1, the vehicle controller 112 may in some embodiments further receive inputs from remote devices associated with a user via a respective user interface, for example a display unit with touchscreen interface. Data transmission between for example the vehicle controller 112 and a remote user interface may take the form of a wireless communications system and associated components as are conventionally known in the art. In certain embodiments, a remote user interface and vehicle control systems for respective work vehicles may be further coordinated or otherwise interact with a remote server or other computing device for the performance of operations in a system as disclosed herein.

The vehicle controller 112 may for example include or be associated with a processor 150, a computer readable medium 152, a communication unit 154, data storage 156 such as for example may include a database network, and the aforementioned user interface 114 (for example as part of an onboard vehicle control panel or otherwise discretely disposed) having a display 118. An input/output device 116, such as a keyboard, joystick, touch screen, or other user interface tool, may be provided so that the human operator may input instructions to the vehicle controller 112. It may be understood that the vehicle controller 112 described herein may be a single controller having all of the described functionality, or it may include multiple controllers wherein the described functionality is distributed among the multiple controllers.

Various operations, steps or algorithms as described in connection with the vehicle controller 112 can be embodied directly in hardware, in a computer program product such as a software module executed by the processor 150, or in a combination of the two. The computer program product can reside in RAM memory, flash memory, ROM memory, EPROM memory, EEPROM memory, registers, hard disk, a removable disk, or any other form of computer-readable medium 152 known in the art. An exemplary computer-readable medium can be coupled to the processor such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" 150 as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

The communication unit 154 may support or provide communications between the controller and external systems or devices, and/or support or provide communication interface with respect to internal components of the work vehicle 102. The communications unit may include wireless communication system components (e.g., via cellular modem, WiFi, Bluetooth or the like) and/or may include one or more wired communications terminals such as universal serial bus ports.

The data storage 156 in an embodiment may for example be configured to receive and store real-time and/or historical data sets regarding work vehicle parameters 204, generated plans including assigned turn types, work area/field boundary parameters, and the like in selectively retrievable form, for example as inputs for developing models as may be used for generating plans based on future input data sets. Data storage as discussed herein may, unless otherwise stated, generally encompass hardware such as volatile or non-volatile storage devices, drives, memory, or other storage media, as well as one or more databases residing thereon.

Figure 2:
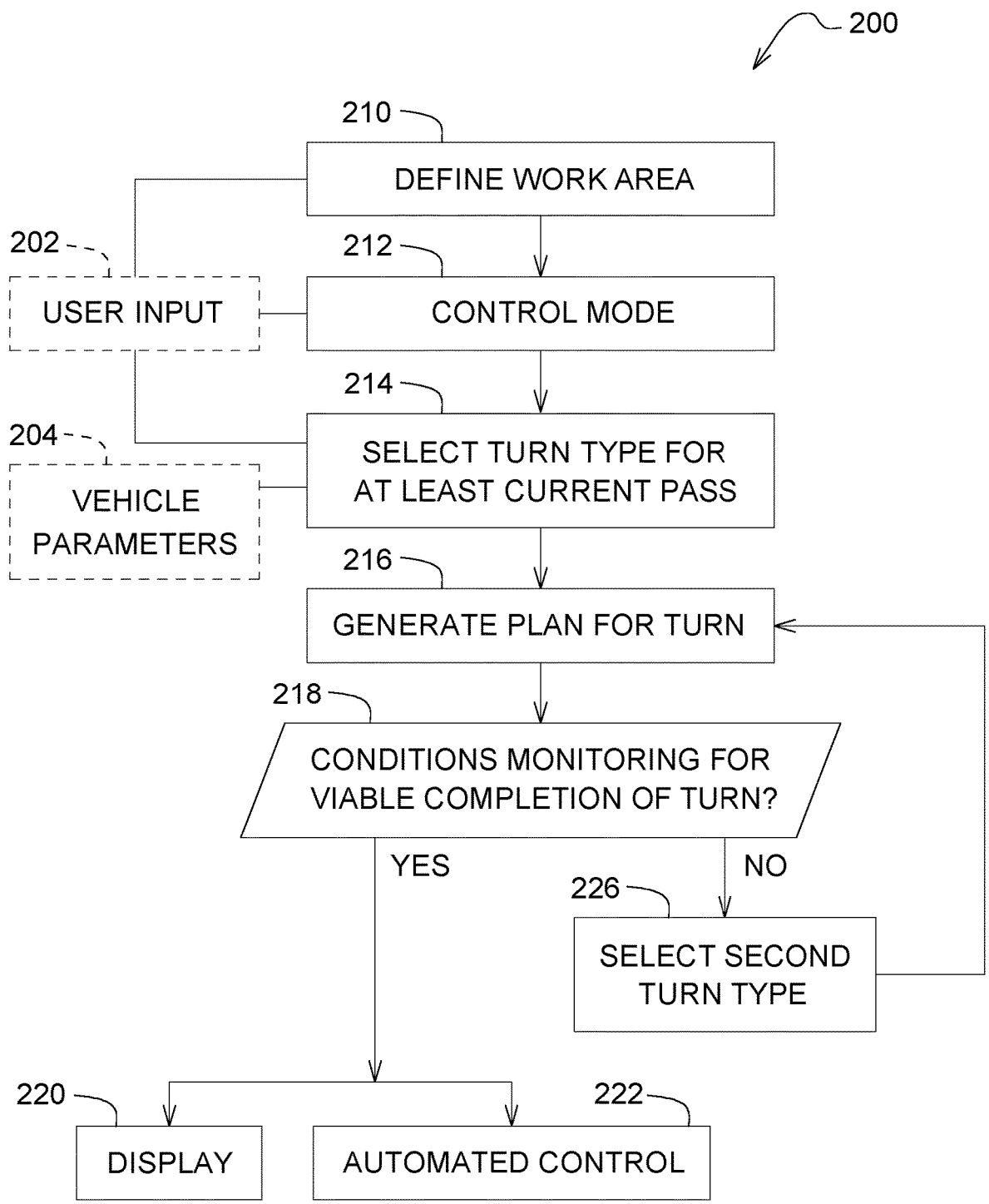
FIG. 2 is a flowchart representing an exemplary method according to an embodiment of the present disclosure.

Referring to FIG. 2, with further reference to FIGS. 3-7 for illustrative purposes, a method 200 of planning and implementing work vehicle traverse of a defined work area may next be described.

A work area may be defined as an initial step 210 with respect to the vehicle controller 112, for example via user input 202. The user interface 114 may be configured to receive the user input 202 for defining a work area such as for example shown in FIG. 4 as including an exterior field boundary 402, a first (upper) headland boundary edge 404a, and a second (lower) headland boundary edge. Headland regions, corresponding for example to an area between the exterior field boundary 402 and the respective headland boundary edge 404a, 404b, may be defined based on input offset values with respect to one or more contours of a previously defined exterior field boundary. For example, a constant offset may be applied across the entirety of an exterior field boundary, or individual offsets (e.g., top and bottom offsets) may be applied to respective contours of the exterior field boundary. A headland region may include one or more headland passes as measured actual driven passes or an applied value based on known work vehicle parameters 204 of an outer region associated with the work area. In various embodiments, including embodiments as further describe herein for illustrative purposes, headland boundaries may be defined as passable boundaries for the work vehicle 102, whereas the exterior field boundaries may be defined as impassable. Additional passable interior boundaries, as well as impassable interior boundaries and corresponding passable headland boundaries (not shown) may further be defined as part of a work area. In various embodiments, the passable interior boundaries and the headland boundaries (for both of the impassable interior boundaries and the impassable exterior boundaries) may be used to prompt users and/or the system automation to complete sequences and/or turns.

The user interface 114 or other component associated with the vehicle controller 112 may further optionally be configured to receive user input 202 for selecting a control mode (step 212). Selected control modes may simply include a manual or automatic mode, or may include a number of hybrid modes wherein turn types are initially manually selected but may be automatically adjusted, initially automatically selected but manually adjustable, etc. The control mode may in various embodiments be selected in accordance with other work states, work vehicle conditions, defined work areas, or the like, rather than relying on user input 202.

The user interface 114 or other component associated with the vehicle controller 112 may further enable user input 202 for selecting a first turn type for at least a current pass of the work vehicle 102 with respect to the defined work area (step 214), or the first turn type may be selected automatically as further described below. In various embodiments, the selection may be made automatically and without manual user input, such as for example where a figure eight turn is a default setting pending further analysis for a current turn, or for example in the case of autonomous vehicles which may dynamically select an optimal turn type for each turn based on one or more predetermined rules and/or quality metrics as further described below.

Figure 5:
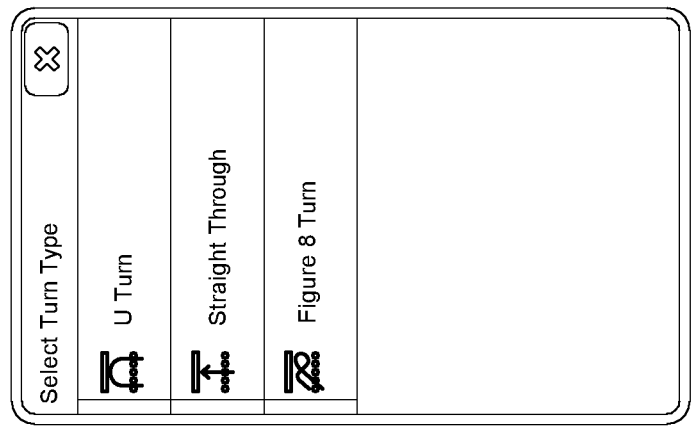
FIG. 5 is a graphical diagram representing an exemplary user interface in accordance with embodiments of a system and method of the present disclosure.
Figure 4:
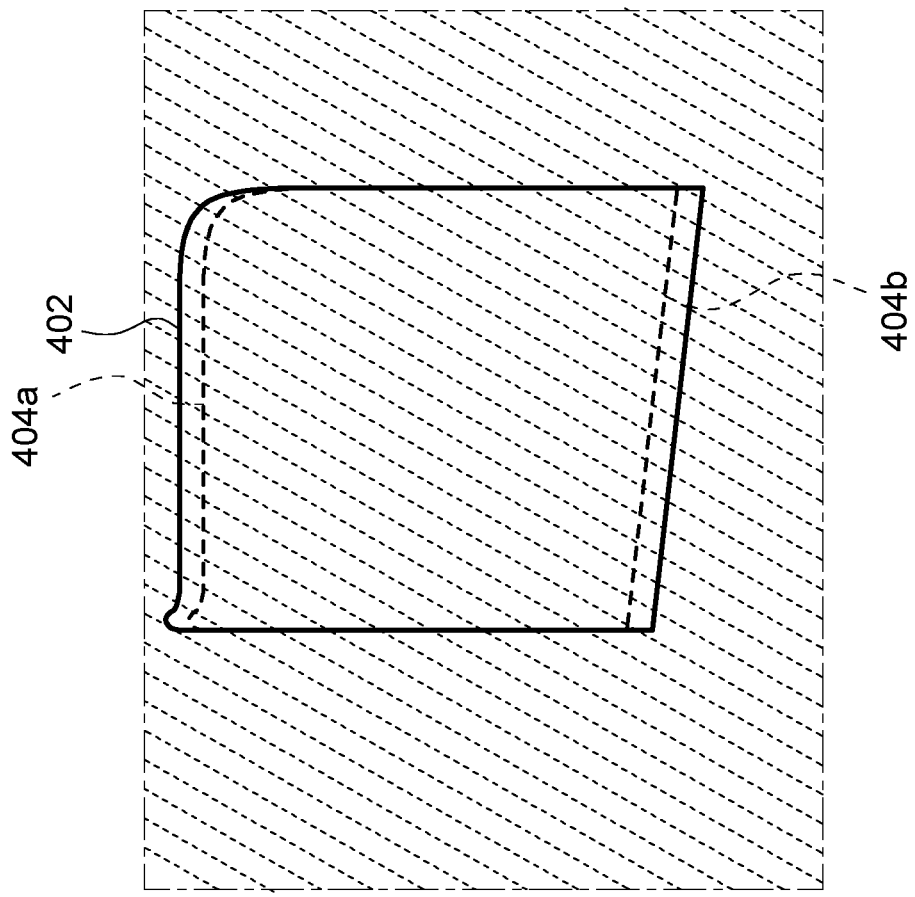

A "first" turn type in this context may refer to whichever turn type is initially selected for a particular pass of the work vehicle 102, rather than consistent reference to a particular turn type. An exemplary display associated with the user interface 114 is shown in FIG. 5, which includes three available turn types for user selection, but it may be understood that any number of turns may be made available for user selection, optionally dependent on work state, work area conditions, work area contours, etc.

Figure 3A:
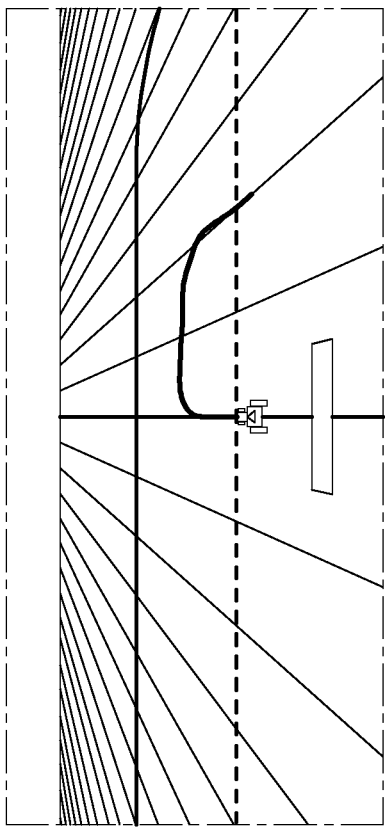
FIG. 3A is a graphical diagram representing a symmetrical light bulb turn type as one possible selectable turn type according to the present disclosure.
Figure 3C:
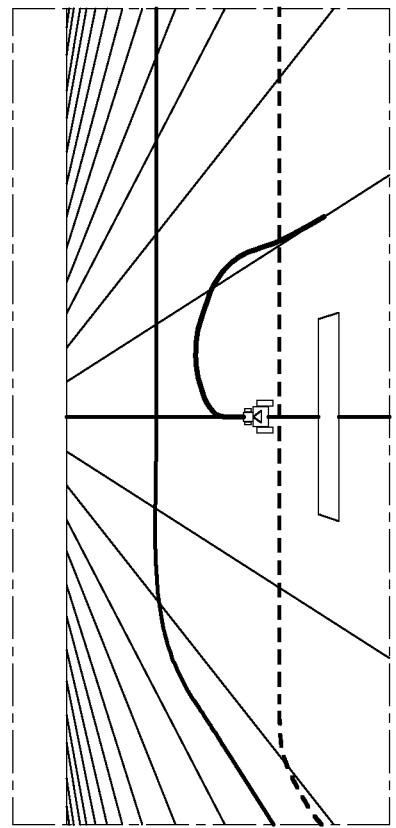
FIG. 3C is a graphical diagram representing an extended simple U-turn type as one possible selectable turn type according to the present disclosure.
Figure 3B:
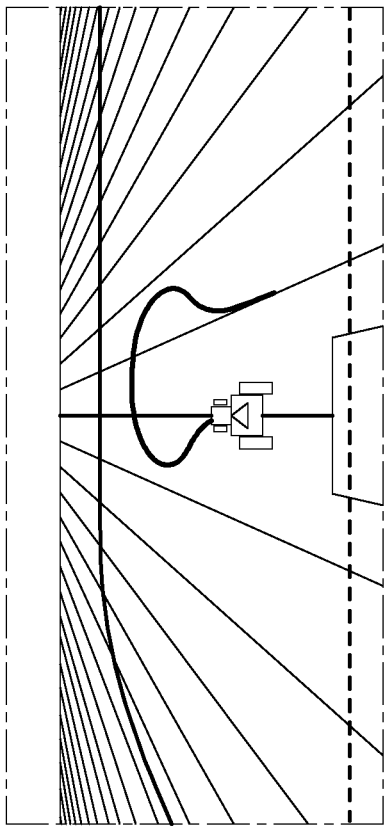
FIG. 3B is a graphical diagram representing a non-symmetrical light bulb turn type as one possible selectable turn type according to the present disclosure.
Figure 3D:
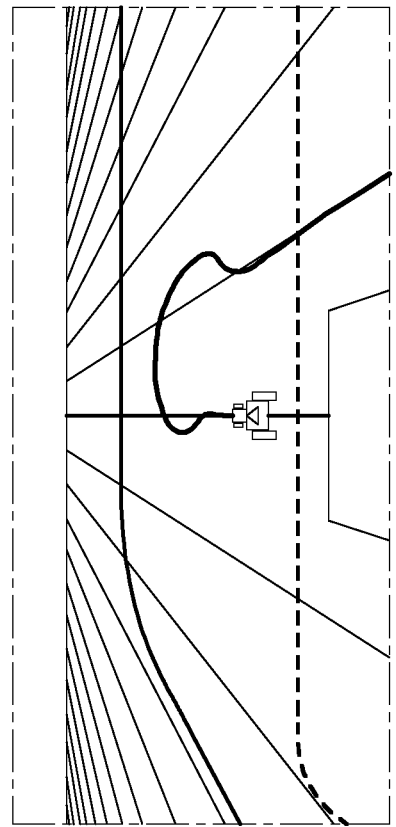
FIG. 3D is a graphical diagram representing a simple U-turn type as one possible selectable turn type according to the present disclosure.

U-turns are one option of a turn type for traditional end-of-row turns to the next pass. There are numerous variants as shown in FIGS. 3A-3D. FIG. 3A represents a symmetrical light bulb turn type, and FIG. 3B represents a non-symmetrical light bulb turn type, in each of which for example a turn radius of the work vehicle is relatively large (>½) with respect to the track spacing. FIG. 3C represents an extended simple turn, wherein for example the turn radius of the work vehicle is relatively large compared to the track spacing and may skip one or more passes in between. FIG. 3D represents a simple U-turn, wherein for example the turn radius of the work vehicle may be substantially equal to or less than the track spacing.

A straight through selection may be available to the operator, which enables the work vehicle to continue through an upcoming exterior boundary that the operator would like to now drive through, and without creating a turn.

Figure 7:
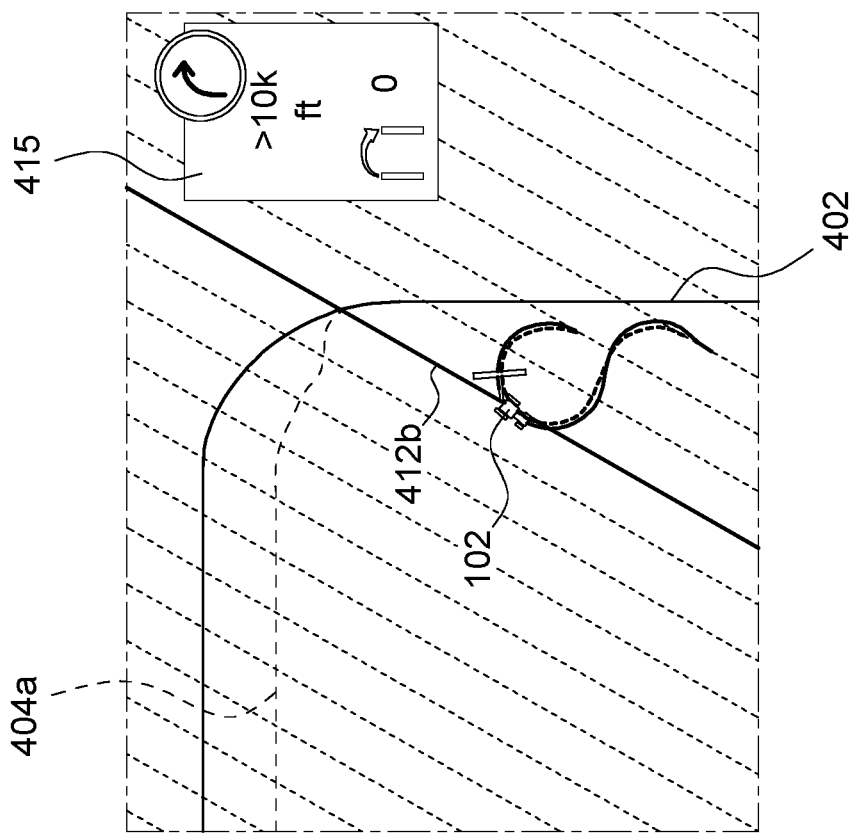
FIGS. 6 and 7 are graphical diagrams representing generation and execution of a figure eight turn type with respect to the defined work area of FIG. 4.
Figure 6:
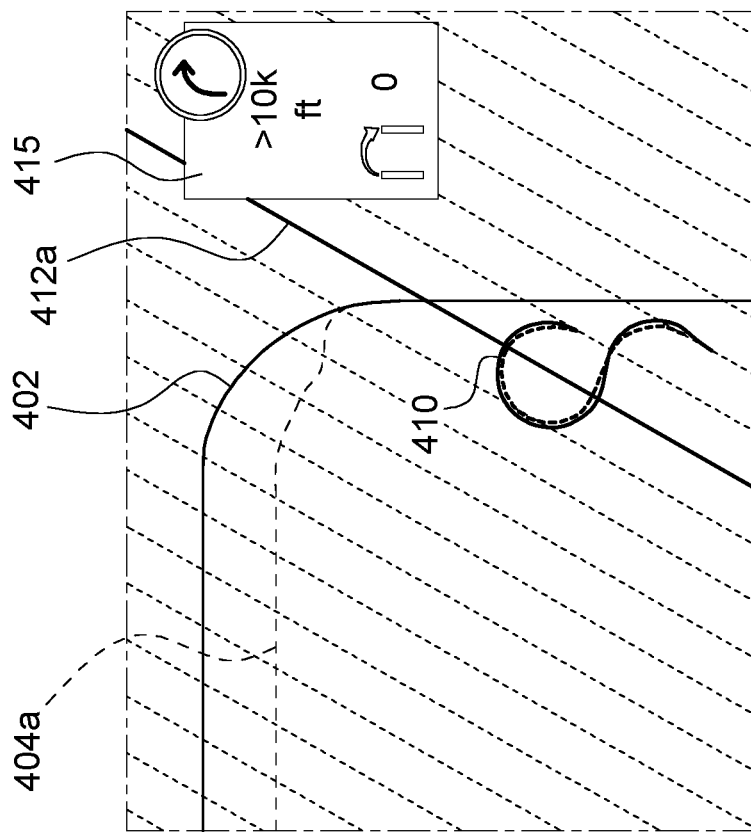

As represented in FIGS. 6 and 7, a figure-eight turn may desirably be used when for example operating at an angle to the field boundary or respective contours at issue (e.g., headland) 402, 404. Generally stated, the figure-eight turn allows the work vehicle to realize a turn path 410 having a tight turn angle to minimize the footprint required to turn around at the field boundary, and allows the field boundary 402 (which may for example be defined as impassable) to be respected with each turn.

With a turn type having been manually or automatically selected in step 214, the method 200 may continue by automatically generating a turn plan for the turn (step 216) and then, depending for example on the previously selected control mode, and further if current conditions merit viable completion of the generated turn plan (step 218), displaying the generated turn plan for operator execution (step 220) or automatically performing the generated turn plan (step 222).

Several of the previously described steps may be combined, changed in order, or deemed redundant in certain embodiments. For example, the system 100 may be configured for a current turn (or for each turn) to generate one or more respective turn plans for each available turn type and to select a preferred turn plan for the current turn, which is then displayed and/or automatically performed. Selection of a preferred turn plan may for example be made based upon one or more specified quality metrics using executed optimization routines and corresponding models which may be predetermined or developed over time, extracted from data storage based on dynamic input data sets, and the like. Quality metrics may be specified for a given work cycle based on a control mode, predetermined for a type of work vehicle or work operation, and the like. Exemplary quality metrics may include optimization of a work vehicle footprint, such as reducing an amount of work area traversed or an amount of a particular portion of the work area traversed for at least a current work vehicle path and turn, and/or optimization of work coverage by the work vehicle or a plurality of work vehicles including the work vehicle, such as maximizing an amount of at least a portion of the work area to be traversed with a minimal number of work vehicle passes/turns. Optimization routines may in various embodiments further account for various current work vehicle operating characteristics and conditions, cost parameters, time parameters, operator parameters, and the like.

A generated turn plan may include multiple track paths 412 at specified angles relative to contours of the exterior field boundary 402, and curved turn paths 410 for each of one or more of the track paths from a turn start intersection point to a turn end intersection point, including for example one or more additional sequence points there between. Sequence points for a given track path and/or corresponding curve path may have default settings, for example in the absence of a determined work coverage by the work vehicle 102 for a given work area, and as may for example be based on learned entry and exit points associated with curves as monitored over time with respect to previous work areas or with respect to the same work area in previous work cycles/iterations.

In an embodiment, the turn plan may be generated further in view of a monitored work coverage by the work vehicle 102, alone or optionally in combination with one or more additional work vehicles. A coverage monitor may be implemented, as part of the vehicle controller 112 or as a discrete module, to determine where the work vehicle 102 and/or any implement, such as a front implement on a combine or a towed planter by a tractor, has covered as the implement travels through the work area. Vehicle controller 112 may be configured to collect location data on one or more points in the work area, such as for collecting and storing GPS coordinates from a GPS receiver with differential correction as the work vehicle 102 traverses an outer region of the work area along the exterior boundary 402 and/or any other area of the work area.

In certain embodiments, the turn plan may be generated based further on a historic path traversed or the coverage by the work vehicle 102 and any other vehicle in the work area. In an embodiment, the vehicle controller 112 alone or in cooperation with a discrete coverage monitor may determine whether to execute a right turn or a left turn to establish a second track path, whether to skip an intervening path disposed adjacent to a first track path, or multiple intervening paths disposed between the first track path and the second track path. Track paths 412a, 412b may be generated to extend in a generally parallel relationship, with track path ends disposed for example at headland boundary edges 404 for a relevant headland region.

In an embodiment, as previously noted a particular control mode may be available for optimization of work vehicle footprint, work coverage, and the like wherein, upon selection, a figure eight turn may be automatically implemented for each monitored track path and associated curve path that allows for such a turn to be made by the work vehicle 102. In this context, operation selection of the figure eight turn type is not required for each pass of the work vehicle 102 while traversing the work area, but is instead provided automatically or at least the vehicle controller 112 is configured to automatically determine which turn type of a plurality of available turn types is most optimal for an upcoming curve path. As further noted below, the optimal nature of a figure eight turn type may be dependent on whether or not an end of the current pass encounters a headland edge, the angle of approach/guidance lines with respect to one or more contours of the exterior field boundary, the work vehicle and/or implement characteristics and/or operating parameters, etc.

In various embodiments, a particular control mode may be available for optimization of, e.g., work vehicle footprint, work coverage, and the like wherein a figure eight turn type is always at least initially drawn but does not necessarily comprise a specified turn radius or corresponding sequence of points which must be intersected for each iteration of such a turn, but a turn radius or sequence may instead be dynamically generated for each pass to provide a turn plan for the work vehicle 102 having a best fit with respect to the contours of the work area, further in view of the operating conditions and parameters at a given time. In other words, the shape, turn radius, points of traverse, and other characteristics of a generated figure eight turn plan may vary for a given work area, or even for given passes/track paths within the work area, based on current conditions and a dynamically determined best fit for the work vehicle for optimizing the work vehicle footprint, work coverage, and the like. In an embodiment, the best fit implementation is not limited to a figure eight turn type but may involve a best fit analysis with respect to any of one or more available turn types to determine a best fit for a given pass and with respect to contours of the work area, even if a figure eight turn type has been selected as the default. The best fit analysis may for example be performed for each available turn type with respect to an optimization routine to reduce an amount of the work area traversed while remaining within external contours of the work area. Such a routine may be predetermined or may be developed over time based on correlation of stored input data sets for each of the various turns with respect to different output parameters such as an area traversed by the work vehicle for example on a per-pass basis, work area coverage for a plurality of passes defining a work plan (e.g., a plurality of path plans, alone or in combination with determined turn plans), and the like.

A turn plan may be generated based on, or adjusted from an initial turn plan based on, information received from an external source, calculated, generated, and/or otherwise defined, determined, and/or stored from initial traverse by the work vehicle 102 of a first track path and, in particular embodiments, one or more subsequent paths. Any defining, determining, and/or storing of information relating to one or more areas covered or traversed may be processed, displayed, and/or stored on a coverage map and/or displayed to the operator of the work vehicle 102 and/or transmitted or displayed to another location.

In an embodiment, the system 100 may be configured to monitor work conditions for determining whether completion of an assigned turn remains viable (step 218). If the assigned turn can be completed based on the monitored conditions, the turn is completed, automatically (step 222) or manually based on display of the generated turn plan (step 220) and corresponding user inputs and/or selections. If the assigned first turn cannot be completed based on the monitored conditions, the vehicle controller 112 may be configured to select a second turn type that can be completed such as for example a U-turn, generate a corresponding turn plan, and automatically direct execution of the turn plan associated with the second turn type (step 226). When determining whether a turn plan can be completed, the vehicle controller 112 may account for a projected implement turn path to be taken by an implement, such as a front implement on a combine or a towed planter by a tractor, to name non-limiting examples, during execution of the generated turn plan by the work vehicle 102.

Particularly in the context of a figure eight turn type, selection and/or completion of the associated turn plan may in some embodiments be determined based on whether or not the turn plan would violate one or more established rules or thresholds, or in other words based on a more rigid analysis where the figure eight turn type is a default preference to be applied unless it is specifically unavailable. In other embodiments, the analysis may be more fluid, wherein for example a best fit analysis is conducted for each of a plurality of turn types, and further in view of various potential iterations of or modifications to the respective turn types, and a figure eight turn type is only selected if it satisfies the conditions of the routine (e.g., optimization of footprint and/or work coverage for a given pass or work cycle).

In particular embodiments, a figure eight turn type may be precluded if the turn plan would overlap with a headland region, wherein a curved turn path 410 for a different turn type may instead be selected and configured to allow the swaths of both the work vehicle 102 and the respective implement to remain outside of a headland boundary edge 404 in the headland region during the execution or traversing of the curved turn path 410. If the vehicle controller 112 determines or predicts that the work vehicle 102 and/or the implement may travel beyond the exterior boundary 402 outside of the headland region, a different (second) turn type may then triggered and automatically initiated in accordance with the embodiment shown in FIG. 2. In other embodiments, the system 100 may initially provide an alert to the operator and enable manual switching from the first turn type to another available turn type or simply full manual operation of the work vehicle 102 in the absence of any selected turn type.

In an embodiment, referring for example to FIGS. 6 and 7, figure eight turns may be generated when selected and further when guidance tracks 412a, 412b are at threshold angles of for example 45° or less with respect to the exterior or headland boundary. The work vehicle 102 may initially decline to generate a figure eight turn, for example displaying indicia 415 including an alert to the operator in place of instructions corresponding to the selected figure eight or other turn type, or automatically switch to a second type (e.g., U-type) of turn if the angle is greater than 45° or otherwise projects to exceed the threshold angle based on monitored conditions.

As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

One of skill in the art may appreciate that when an element herein is referred to as being "coupled" to another element, it can be directly connected to the other element or intervening elements may be present.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A computer-implemented method of guidance and/or automation for a self-propelled work vehicle operating within a defined work area, the method comprising:
   selecting a first turn type comprising a figure eight turn to be executed at least to transition between a first path across at least a portion of the work area into a second path substantially parallel to the first path for reciprocal traverse of the at least a portion of the work area;
   responsive to said selection, automatically generating a first turn plan and associated output signals for the first turn type relative to one or more contours of the defined work area.

2. The computer-implemented method of claim 1, further comprising upon ascertaining that the work vehicle is unable to complete the generated first turn plan, based on one or more detected work vehicle conditions relative to at least the one or more contours of the defined work area, automatically selecting a second turn type, generating a second turn plan for the second turn type and producing output signals for automated performance of the second turn plan.

3. The computer-implemented method of claim 2, comprising generating a plurality of sequence points in association with the generated first turn plan, and ascertaining that the work vehicle is unable to complete the generated first turn plan based on a deviation between an actual trajectory of the work vehicle relative to one or more of the plurality of sequence points.

4. The computer-implemented method of claim 1, comprising enabling manual selection of the first turn type and/or the second turn type from a plurality of selectable turn types via an onboard user interface.

5. The computer-implemented method of claim 4, wherein the figure eight turn type is selectively set as a default first turn type based on user input via the onboard user interface, and wherein an alternative turn type for a given turn is dynamically and automatically selected from a plurality of selectable turn types based at least in part on a best fit analysis of each selectable turn type with respect to at least one specified quality metric.

6. The computer-implemented method of claim 1, wherein the output signals with respect to at least a current turn are provided to an onboard display unit for displaying one or more dynamically generated sequence points based on a determined work coverage for the work vehicle with respect to at least the one or more contours of the defined work area and one or more previously traversed paths of the work vehicle within the one or more contours of the defined work area.

7. The computer-implemented method of claim 6, wherein one or more sequence points for the current turn are predetermined based on a lack of determined work coverage for the work vehicle with respect to the one or more contours of the defined work area.

8. The computer-implemented method of claim 1, wherein the first turn plan is generated based at least in part on a footprint optimization routine.

9. The computer-implemented method of claim 1, wherein the first turn plan is generated based at least in part on a work coverage optimization routine.

10. The computer-implemented method of claim 1, comprising automatically selecting the first turn type from a plurality of selectable turn types based at least in part on a best fit analysis of each selectable turn type with respect to at least one specified quality metric.

11. The computer-implemented method of claim 1, comprising generating the output signals associated with the first turn type for automatically controlling a trajectory and/or advance speed for the work vehicle.

12. The computer-implemented method of claim 11, comprising generating the output signals associated with the first turn type for automatically controlling a raised and/or lowered position for each of one or more work implements.

13. The computer-implemented method of claim 11, wherein a controls sequence is executed based on a determined work coverage for the work vehicle with respect to at least the one or more contours of the defined work area and one or more previous traversed paths of the work vehicle within the one or more contours of the defined work area.

14. The computer-implemented method of claim 11, wherein a predetermined controls sequence is executed based on a lack of determined work coverage for the work vehicle with respect to the one or more contours of the defined work area.

15. The computer-implemented method of claim 1, wherein the defined work area comprises one or more impassable exterior contours, one or more passable offset contours with respect to at least one of the one or more impassable exterior contours, and/or one or more impassable interior boundaries within the one or more impassable exterior contours.

16. A system for guidance and/or automation of a self-propelled work vehicle operating within a defined work area, the system comprising:
   a user interface configured to receive user input corresponding to a selected turn type from a plurality of selectable turn types; and
   a controller configured, upon selection of a first turn type comprising a figure eight turn to be executed at least to transition between a first path across at least a portion of the work area into a second path substantially parallel to the first path for reciprocal traverse of the at least a portion of the work area, to generate a first turn plan and associated output signals for the first turn type relative to one or more contours of the defined work area.

17. The system of claim 16, wherein the controller is further configured upon ascertaining that the work vehicle is unable to complete the generated first turn plan, based on one or more detected work vehicle conditions relative to at least the one or more contours of the defined work area, to automatically select a second turn type, generate a second turn plan for the second turn type, and produce output signals for automated performance of the second turn plan.

18. The system of claim 16, wherein the output signals for the first turn type are provided to an onboard display unit for displaying the generated first turn plan comprising one or more sequence points based on an operating mode for the work vehicle, and/or to one or more work vehicle actuators for automated control of a trajectory for the work vehicle, an advance speed for the work vehicle, and/or a raised and/or lowered position for each of one or more work implements associated with the work vehicle.

19. The system of claim 18, wherein a sequence for a turn is dynamically generated for the first turn type based on a determined work coverage for the work vehicle with respect to at least the one or more contours of the defined work area and one or more previous traversed paths of the work vehicle within the one or more contours of the defined work area.

20. The system of claim 18, wherein a sequence for a turn is predetermined based on a lack of determined work coverage for the work vehicle with respect to the one or more contours of the defined work area.

* * * * *